United States Patent [19]

Perruso

[11] 4,265,463
[45] May 5, 1981

[54] COMBINATION VEHICLE FOR TOWING, DUMPING AND THE LIKE

[76] Inventor: Robert S. Perruso, 150 Maple St., West Orange, N.J. 07052

[21] Appl. No.: 4,862

[22] Filed: Jan. 19, 1979

[51] Int. Cl.³ .............................................. B60P 3/06
[52] U.S. Cl. .................................. 280/402; 414/563; 298/1 R
[58] Field of Search ............... 280/402; 414/563, 560, 414/542, 473, 912; 212/8; 298/1 R

[56] References Cited

U.S. PATENT DOCUMENTS

| | | | |
|---|---|---|---|
| 2,111,341 | 3/1938 | Tetrault | 415/563 |
| 2,244,559 | 6/1941 | Lawton | 212/8 R |
| 2,406,620 | 8/1946 | Luckett | 212/8 R |
| 2,449,146 | 9/1948 | Ryan | 414/563 |
| 2,481,223 | 9/1949 | Johnson | 414/563 |
| 2,818,981 | 1/1958 | Heimbigner | 414/912 |
| 3,298,744 | 1/1967 | Keim | 298/17 R |
| 3,460,696 | 8/1969 | Owen | 414/560 X |
| 4,000,823 | 1/1977 | Aquila | 414/563 |

FOREIGN PATENT DOCUMENTS 2274469  1/1976  France ..................... 280/402

Primary Examiner—John A. Pekar
Attorney, Agent, or Firm—Pennie & Edmonds

[57] ABSTRACT

A vehicle (10) is adapted for dual and alternative use either as a dump truck or a tow truck and readily converted from one use to the other. The vehicle includes a chassis (12), a bed (14) pivotally mounted on the chassis for locating a boom (50) and end attachment structure (84, 88 and 90) in position for connection to a disabled vehicle (48) when the bed is moved from a first position (FIG. 2) to a second position (FIG. 1). And, a two-way hydraulic cylinder (108) is connected between the chassis and bed to move the bed to the second position; and, then, using the leverage of the bed to return it while lifting the disabled vehicle to the first position. The boom is supported by a vertical support (52) and a cable (54) connected at opposite ends to the bed and boom and entrained therebetween on a wheel (104) mounted on the vertical support.

14 Claims, 10 Drawing Figures

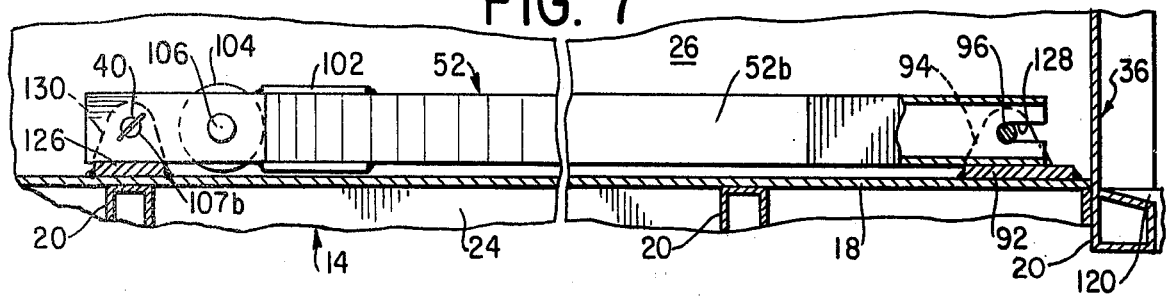
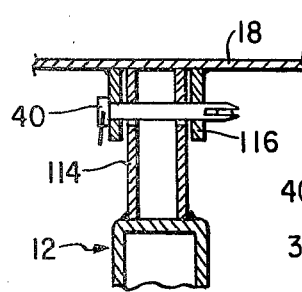
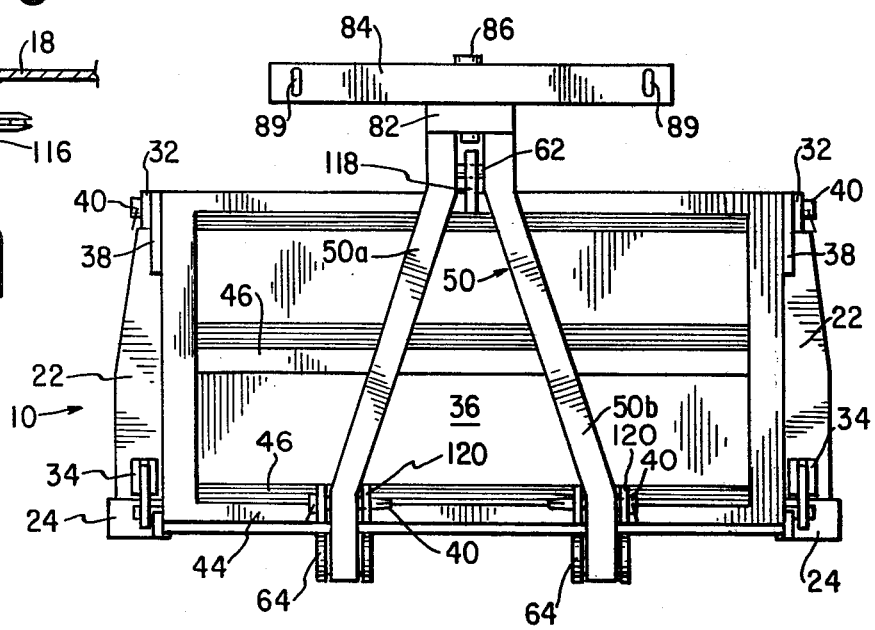
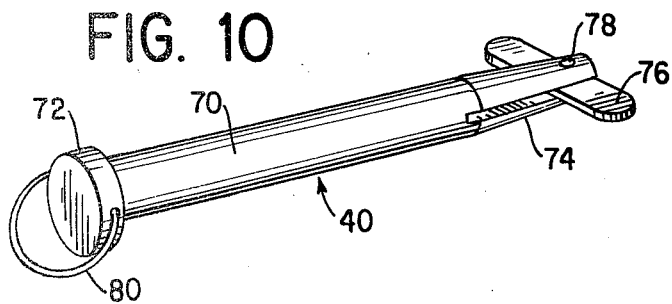

COMBINATION VEHICLE FOR TOWING, DUMPING AND THE LIKE

TECHNICAL FIELD

The present invention relates to a vehicle capable of alternative use either in a capacity of a truck, such as a dump truck having capability, also, of functioning as a "pick-up" truck, or as a tow truck and readily converted from one use to the other.

BACKGROUND ART

Aside from the conventional tow truck which incorporates a winch, a power take-off mechanism connecting with the transmission of the truck and latching structure to lock the winch for towing, there have been attempts in the prior art to provide a vehicle designed for one type of use with structure whereby that vehicle may be utilized in a second mode of operation. A rather recent patent, namely, U.S. Pat. No. 4,000,823 to J. Aquila describes a vehicle commonly characterized as a "pick-up" truck which is provided with a towing crane, portions of which are permanently mounted in the bed of the vehicle. Aquila indicates that portions of the towing crane, as for example, the tow bar, front boom section and rear boom section necessary for lifting and towing may be removed from the permanently mounted portions which remain in the bed when the towing crane is not in use. The lifting and towing operation is accomplished by the tow bar and boom sections as well as a power cylinder connected between the boom sections and the permanently mounted portions. The power cylinder has no other function and Aquila, also, suggests that the rod of the power cylinder may be retracted fully so that the power cylinder may nest with the other portions in the bed of the vehicle.

The prior art also includes other forms of vehicles which support structure capable of use in the lifting and towing of a second vehicle. For example, U.S. Pat. No. 2,449,146 to C. N. Ryan, includes a lifting and towing structure which is secured to the bed or frame of the vehicle for purposes of converting the vehicle to a wrecking truck or vehicle-pulling car. The Ryan structure utilizes an hydraulic cylinder which through a piston rod imparts movement to the lifting frame which is capable of pivoting about a pair of spaced pivot points located forwardly (toward the vehicle cab) of a stationary frame structure secured to the bed or frame. Through movement of the lifting frame, the boom may be raised. Thereafter, the lifting frame is latched in the boom raised position for purposes of towing a second vehicle. In U.S. Pat. No. 2,481,223 to B. M. Johnson, a lifting and towing mechanism is attached to the fifth wheel of a tractor in the same manner as a conventional trailer is attached to the tractor. The lifting and towing mechanism includes a section which pivots about the end of the tractor frame and a boom which is adjusted both longitudinally and horizontally relative to a stationary portion of the towing mechanism. The boom is controlled in movement by an hydraulic lift.

U.S. Pat. No. 3,298,744 to A. J. Keim discloses a mechanism which is utilized as a trailer hitch in the towing of an unpropelled vehicle, such as a grain wagon. The trailer hitch is described as being connected to the underside of the bed of a dump truck in a position so as not to interfere with the hydraulic mechanism provided for raising the bed or with the structure about which the bed of the dump truck pivots in a dumping operation. The trailer hitch extends downwardly from a position to the rear of the bed and a hitch plate is attached to its end. A tubular sleeve is supported by a bracket carried on the frame to the underside of the bed and a rod connected at one end to the trailer hitch is telescopically received into and out of the sleeve thereby to permit movement of the trailer between an operative and a collapsed, stored position.

None of the prior art is directed to, nor does it provide, a solution of an alternative capability of use of a vehicle in the capacity either of a truck, such as a dump truck and also as a truck for transport of a load or as a tow truck utilizing for lifting and towing an hydraulic cylinder which also functions to provide for movement of the bed of the vehicle when employed as a dump truck. Thus, the hydraulic mechanism has a dual function and through implementation of an hydraulic cylinder capable of providing positive action in both directions of movement of a piston rod the bed of the vehicle is caused to pivot about a pivot axis to an inclined dumping position and to be positively returned to a horizontal non-dumping position. These movements make it possible to employ the vehicle in the dual capacity, as will be fully explained below. The conventional tow trucks which utilize a winch and the allied power mechanisms for lifting and towing are incapable of satisfactorily serving in a dual capacity, such as contemplated herein for reason that the power mechanisms and winch leave little or no additional space in the bed of the tow truck.

DISCLOSURE OF INVENTION

The present invention is directed to a vehicle adapted for alternative use either in a capacity of a truck, such as a dump truck having capability, also, of functioning as a pickup truck or in the capacity of a tow truck and readily converted from one use to the other.

As an important aspect of the invention, dual capability of use of the vehicle resides in the combination of a boom attached to the bed of the vehicle to extend rearwardly, means to support the boom in cantilevered fashion and a two-way hydraulic cylinder mounted on the vehicle chassis and together with the piston rod connecting the chassis to the bed, thereby to utilize the leverage of the bed in the lifting and towing of a second vehicle. Thus, the invention relates to a vehicle system which incorporates in its operation portions of the vehicle including the bed which is capable of movement relative to the chassis about a pivot or spaced apart pivot points and structure in the form of a boom mounted on the bed thereby to move with the bed between an inclined dumping position at which connection may be made between the boom and second vehicle and a horizontal non-dumping position whereby the second vehicle is lifted for towing. More particularly, in the conventional dump truck, the hydraulic mechanism includes a one-way hydraulic cylinder to raise the bed to the inclined position which then is allowed to relocate to the horizontal position relative to the chassis as hydraulic fluid is allowed to bleed from the cylinder in return to a reservoir. The vehicle system of the present invention utilizes a two-way hydraulic cylinder for purposes of both raising the bed to the inclined position and positively returning the bed to the horizontal position. Thus, the vehicle system allows the convertible implementation of a conventional vehicle, capable of use as a dump truck, to a vehicle having a capacity of a tow truck without the requirement of cables, booms and winches that normally are associated with a conventional tow truck, and of functioning in either selected mode of operation. The vehicle system is efficient, it provides flexibility of use of the vehicle in one of two alternative capacities and because of this flexibility in use, it allows for the realization of monetary saving in the elimination of duplicate operating costs as would normally be associated with ownership of a second vehicle oftentimes required by a body shop, gas station, or similar business, to accomplish both towing and hauling of parts, for example. Also, the vehicle system of the invention allows for the realization of monetary saving in connection with labor, fuel, insurance, taxes, and so forth, associated with the second vehicle. Furthermore, in view of the fact that lifting and towing may be accomplished without the need of conventional types of structures, such as cables, winches and booms, one may realize a reduction in the incidents of damage and/or breakage of the more complex, conventional equipment.

As a further aspect of the invention, the means for support of the boom may comprise a support bipod extending from the bed of the vehicle and secured to the tailgate, and a cable releaseably secured at a forward point in the bed and at the cantilevered end of the boom. The cable may be entrained about a wheel which may be a rotatable pulley carried by the support bipod. The wheel may be adjusted to a plurality of vertical positions on the support bipod to adjust, for any predetermined length cable, the angle of the boom relative to the bed of the vehicle. The wheel preferably includes an arcuate channel therearound within which the cable is confined.

Typically, a dump truck will employ an hydraulic cylinder having a 4 to 5-ton lifting capability. Utilizing a two-way hydraulic cylinder having a lifting capability within this range, it is found that a second vehicle having a weight within the range of approximately 2 tons, may be quite easily lifted and towed by the vehicle system of the present invention.

As a further aspect of the invention, the boom and the means for supporting the boom may be relocated to a non-operative position when the vehicle is used in the other modes of operation. Thus, the boom extending to the rear of the vehicle may be removed with relative ease and stored, while the support bipod may be pivoted to a position juxtaposed to the bed of the vehicle and secured in that position. The support bipod does not hamper use of the vehicle after conversion from the mode of a tow truck to that of a dump truck. If desired, a false floor may be located above the structure to completely confine it if it is considered that the support bipod would pose a problem in or inconvenience to use of the truck.

DESCRIPTION OF THE DRAWING

FIG. 7 is a partial view of the support bipod having been moved about a pivot axis to the position juxtaposed to the bed of the vehicle between the tailgate and forward bulkhead;

FIG. 8 is a view in section as seen along the line 8—8 in FIG. 2;

FIG. 9 is a partial view of the boom located to a position at which it is parallel to and removably mounted on the tailgate of the vehicle; and FIG. 10 is a view in perspective of a pin, enlarged in dimension, which may be used in securement of structure.

BEST MODE FOR CARRYING OUT THE INVENTION

Figure 1:
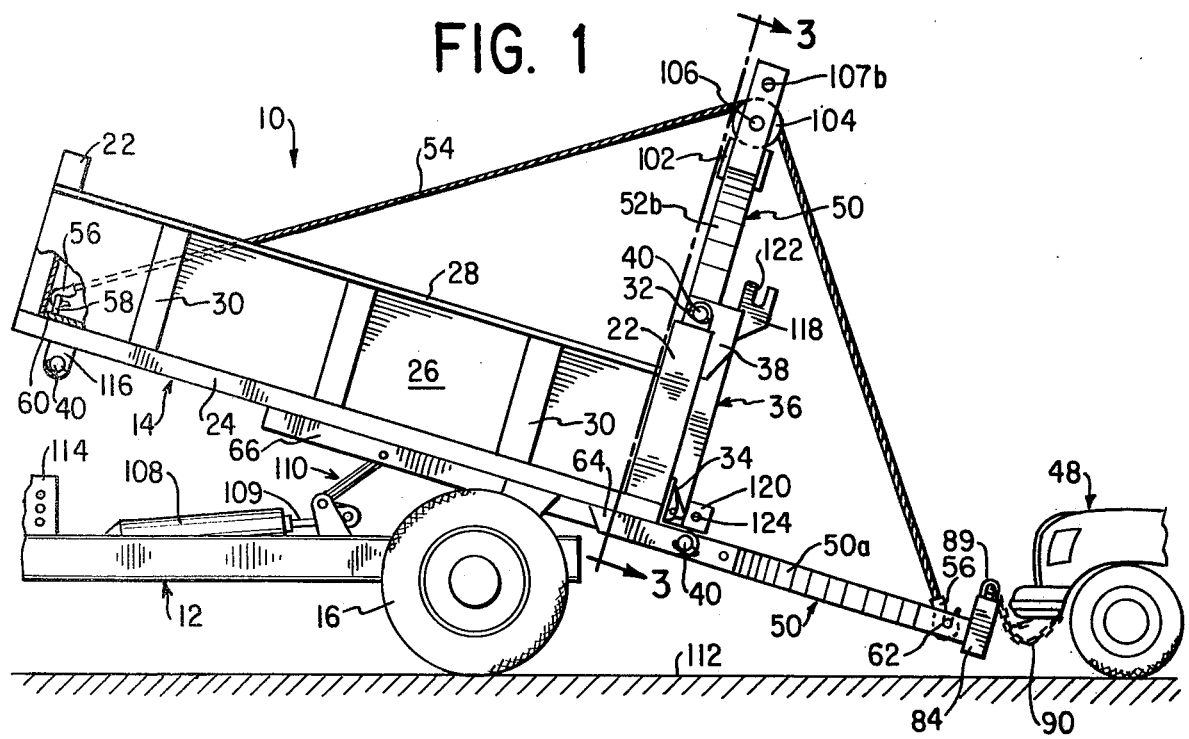
FIG. 1 is illustrative of the vehicle system showing a portion of the chassis of a vehicle with the bed at a position of incline relative to the chassis for locating the boom to a lowered position for attachment to a second vehicle preparatory to lifting the second vehicle.
Figure 2:
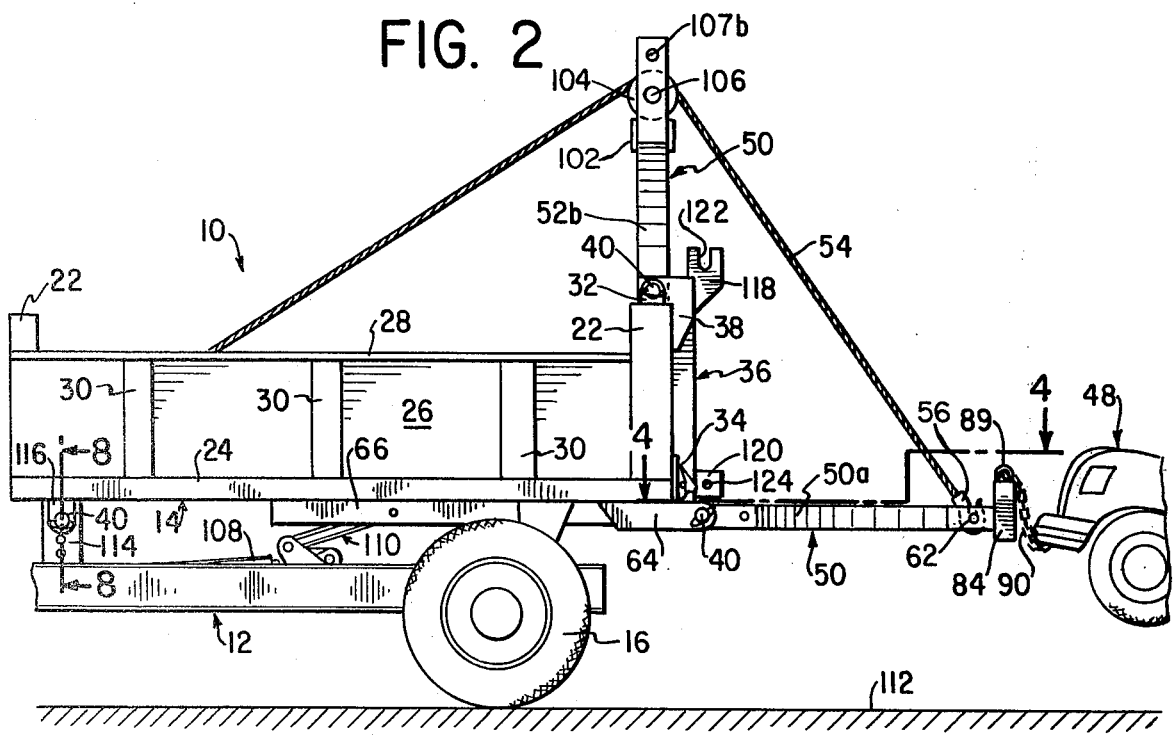
FIG. 2 is a view of the vehicle system, similar to that in FIG. 1, with the bed of the vehicle relocated to the normal position on the chassis and the second vehicle having been lifted so that it may be towed.

The vehicle of the vehicle system having capability of dual and alternative use either as a dump truck or as a tow truck and which is readily converted from one use to the other may be seen in FIGS. 1 and 2. Referring to those figures, the vehicle, generally identified by the numeral 10, includes a chassis 12 and a bed 14 mounted to the chassis. The mounting of the bed may be accomplished in any manner as may be conventional in the art thereby to allow the bed to pivot about a single, but preferably a pair of spaced pivot axes (not shown). The pivot axes are located to the rear of the chassis between and in the region generally of the rear wheels 16. The rear wheels are supported on an axle connected to the drive shaft and the bed includes a floor 18 supported by a matrix of sills including sills 20 extending transverse to the length of the bed and longitudinal sills 24 to which the sills 20 are secured as by welding. The sills 24 extend the length of the bed and support a plurality of posts 22 located at the corners of the bed. Side walls 26 and the front bulkhead (not shown) are carried by the posts. The sidewalls and bulkhead may be riveted or similarly supported by the posts and the posts may be welded or similarly mounted to the sills 24. Structures to be described, and other than as expressly discussed, may be considered as being welded or otherwise mounted by conventional techniques commonly employed with materials capable of use in the manufacture of the portions of the vehicle and the lifting and towing structure. The side walls may include an upper wall 28 preferably integral therewith and extending outwardly along their upper edges. Each side wall, and similarly the bulkhead, may include a plurality of ribs 30, such as the vertical ribs of the Figures, or ribs crossbuck in outline, which together with the upper wall provide added strength. A bracket 32 including a pair of spaced apart ears is mounted on the top surface each of the posts 22 to the rear of the bed and a further pair of brackets 34 are supported to the base of the posts 22. A tailgate 36 is pivotally mounted on the upper brackets 32 and secured in a closed position by the lower brackets 34. To this end, a pair of plates 38 are supported on the sides of the tailgate and the plates include a third ear dimensioned to pass between the spaced apart ears of bracket 32. Each of the ears is provided with a throughbore and a pin 40 (see FIG. 10) is passed through each bracket to provide a pair of pivot axes about which the tailgate may pivot. A further pair of pins, such as pins 40, may be received through a bore in each of the brackets 34 and into the supporting frame 44 of tailgate 36 for securing the tailgate in the closed position. The tailgate may be provided with one or more ribs 46, such as the horizontally aligned ribs (see FIG. 9) or of cross-buck outline, thereby with frame 44 to strengthen the tailgate.

Figure 3:
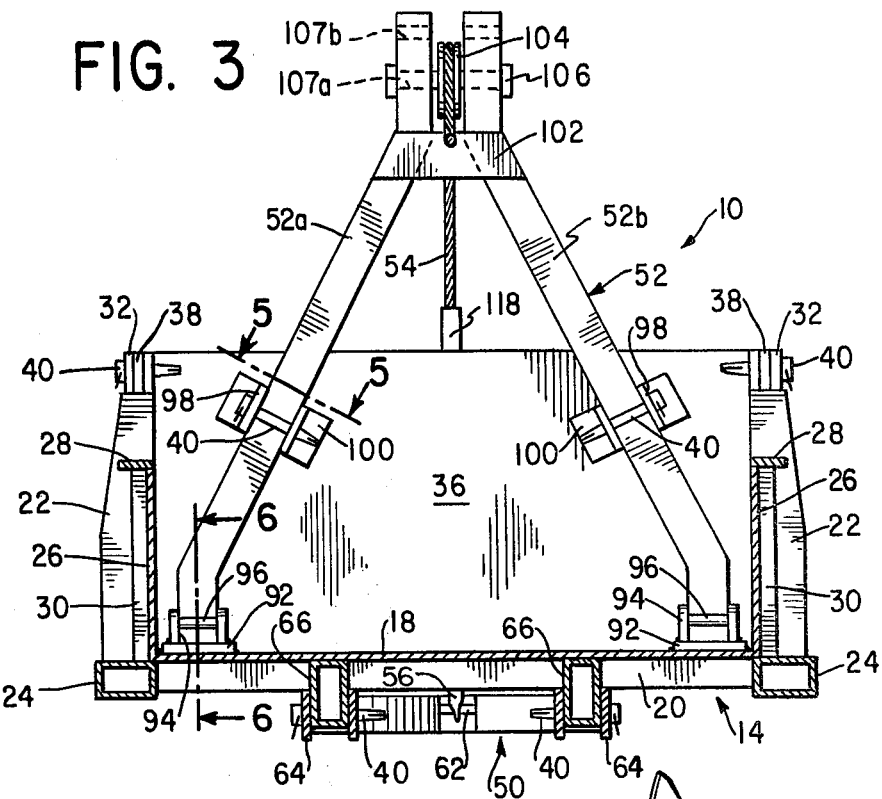
FIG. 3 is a view in section as seen along the line 3—3 in FIG. 1.
Figure 4:
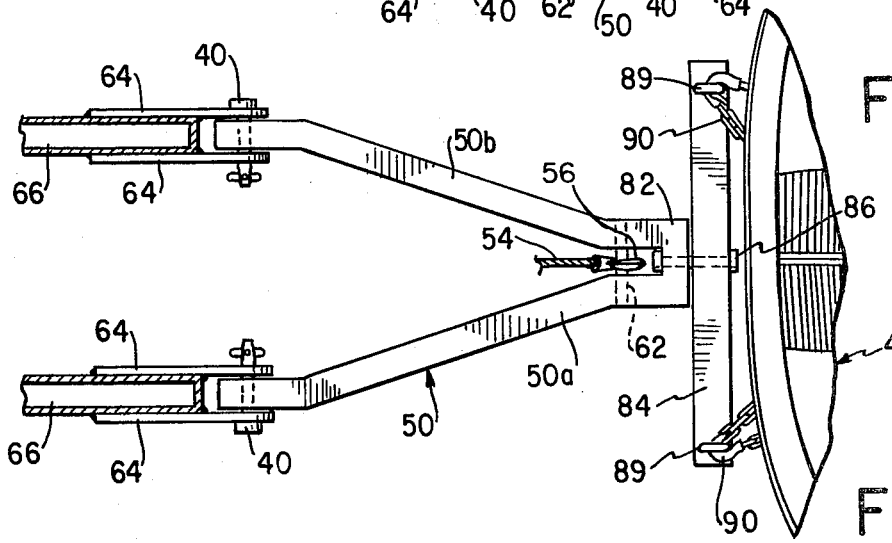
FIG. 4 is a view in section as seen along the line 4—4 in FIG. 2.
Figure 5:
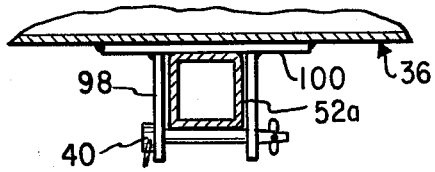
FIG. 5 is a view in section as seen along the line 5—5 in FIG. 3.
Figure 6:
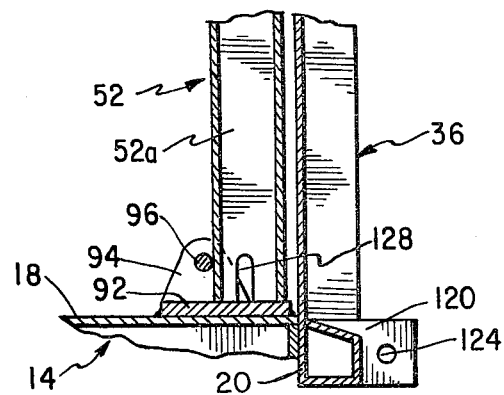
FIG. 6 is a view in section as seen along the line 6—6 in FIG. 3.

As an important aspect of the present invention, the vehicle 10 may be readily converted from use as a dump truck to an alternative use as a vehicle capable of both lifting and towing a second vehicle 48, illustrated partially in FIGS. 1, 2 and 4. The lifting and towing structure includes a boom 50 in the form of a bipod which is connected to the bed 14, as seen in FIGS. 1-3. As illustrated, the boom extends rearwardly of the bed. The lifting and towing structure also includes a bipod 52 serving as a support bipod. As perhaps best illustrated in FIGS. 3 and 6, the support bipod is supported on the floor 18 of bed 14 and secured to the inside surface of tailgate 36 thereby to extend vertically, upwardly of the bed. A cable 54 is connected at the cantilevered end of the boom and at a point located adjacent the bulkhead of the bed 14. To this end, a claw or hook 56 is connected to each end of the cable to engage with an eye bolt 58 supported on a plate 60 secured to floor 18 and an axle 62 supported by the boom. Each bipod 50, 52 is of substantially similar construction to include a pair of spaced apart legs 50a, 50b, and 52a, 52b, respectively.

As may be seen in FIGS. 3 and 4, the legs 50a, 50b of boom 50 generally follow a wishbone configuration thereby to extend toward the cantilevered end throughout a short parallel length and a longer inwardly directed length which terminates in a second parallel length having substantially closer spacing. The legs are received between a pair of spaced apart plates forming a bracket 64. The plates extend along and rearwardly of a pair of sills 66 of a sub-frame located inwardly of the sills 24. The sills 66 similarly may be welded to the matrix of sills 20, 24, and all sills may be rectangular in cross-section. Preferably, the sills are hollow so as not to add unnecessarily to the weight of the vehicle or the bed 14 to be lifted. Both plates of brackets 64 and the legs 50a, 50b include a bore therethrough. A pin, such as the pin 40 is provided for mounting the boom and located on an axis about which the legs 50a, 50b may pivot.

The pin 40 (see FIG. 10) includes a shank 70 elongated in length and extending from a head 72 to an end 74 having a tapered, bifurcated configuration. A plate 76 of an elongated oval outline is received between facing surfaces within the bifurcated end and supported on an axle 78 thereby to move rotationally thereabout from a disposition as seen in FIG. 10 to a disposition at which one end of the plate is received between the two faces. In this manner, pin 40 may be received through the bores in each plate of brackets 64 and through the legs 50a, 50b. Thereafter, the plate 76 may be located rotationally to the FIG. 10 position at which the pin locks the structure in place. A ring 80 is carried by the head 72 for purposes of grasping the pin and retracting it from the bores once the plate is located to the recessed position.

The legs are supported at their cantilevered end by a member 82. The member (see FIG. 3) extends therebetween and supports a tow bar 84. The tow bar may be mounted in any conventional fashion, such as, by means of a combination nut and bolt 86.

The tow bar extends laterally of the boom as may be seen to advantage in FIG. 9 and has a major cross-sectional dimension to extend both above and below the legs 50a, 50b. A pair of eye bolts 89 are carried at opposite ends of the tow bar for purposes of receipt of a chain 90 which either may be permanently carried by the eye bolts or else may be secured to the eye bolts after having been secured to the frame or suspension of the vehicle 48.

The support bipod 52 is constructed like that of boom 50. To this end, the legs 52a, 52b are parallel and widely spaced at one end and are inclined toward the other end at which the legs are parallel, yet of significantly decreased spacing. As illustrated in FIG. 3, each leg of support bipod 52 is supported on a plate 92 carried on the floor 18 of bed 14. The legs are confined in what may be considered a socket formed by the spaced apart ears of bracket 94, an axle 96 extending between the ears having a function to be described below and the inside surface of tailgate 36. The legs 52a, 52b of support bipod 52 as the legs 50a, 50b of boom 50 may be of rectangular cross-section and preferably hollow throughout. Preferably, the legs of each bipod are of a square cross-section and the legs of bipod 52 may be of greater dimension. In a preferred embodiment, the legs of boom 50 may be 3 inches on a side; whereas, the legs of support bipod 52 may be 4 inches on a side.

The support bipod 52 is secured in a substantially vertical orientation by means of a pair of brackets 98 carried on the inside surface of tailgate 36. Each bracket includes a pair of spaced apart ears mounted by a plate 100. The ears of bracket 98 extend outwardly from the plate throughout a distance so that the legs 52a, 52b may be fully received therebetween. Each ear is bored and a pair of pins 40, as previously described are received therethrough. The pins will, therefore, secure each leg against the tailgate.

A bar 102 supports the closely spaced ends of legs 52a, 52b and a wheel 104 is carried on an axle 106. The axle is supported in one or another of a pair of aligned bores 107a, 107b (see FIGS. 1 and 2) of legs 52a, 52b. The wheel may be mounted for rotation and the cable 54 is received around the wheel in an arcuate channel. The vehicle, in the adaptation or mode of use as a tow truck, will have the lifting and towing structure including the boom 50, the support bipod 52, cable 54 and tow bar 84 for purposes of lifting and towing the vehicle 48 in an operative position. In operation, an hydraulic cylinder 108 having push-pull or two-way capability is charged thereby to cause the bed 14 to pivot about the pivot axes on the chassis 12 for movement. The cylinder may be mounted on the chassis 12 and the piston rod 109 may be connected either to the bed 14 (such as subframe 66) or to a linkage 110 for movement of the bed between the FIGS. 1 and 2 positions. In the FIG. 1 position, the tow bar 84 and chains 90 may be suitably affixed to the frame or suspension of vehicle 48 thereby to enable the vehicle to be lifted in movement of the bed to the FIG. 2 position. Normally, a truck having dumping capability utilizes an hydraulic cylinder having a capacity of 4 to 5 tons which has been found sufficient to pull the bed 14 from the FIG. 1 to the FIG. 2 position. Thus, the vehicle 48 having been secured to tow bar 84 by chains 90 is lifted from the surface of roadway 112 to be towed.

A bracket 114 including a pair of spaced apart ears is carried by chassis 12. The ears extend upwardly and are received between a pair of ears 116 which similarly are spaced apart and extend downwardly from the matrix of sills of bed 14. Each of the ears 116 and the ears of bracket 114 are provided with bores which are aligned in the FIG. 2 position thereby to receive a pin which may be a pin 40 to secure the bed 14 to chassis 12 during a towing operation. One bracket 114, but preferably a pair of brackets, and interacting ears 116 are located to each side of the chassis for this function. Bracket 114 preferably includes a series of bores as shown in FIGS. 1 and 2 to provide alternate locking positions for bed 14 during a specific towing operation. When it is desired to convert the vehicle from a tow truck to its alternative use as a dump truck, the boom 50 may be released from the brackets 64. This is accomplished with relative ease by retracting pins 40 from the aligned bores in each bracket and legs 50a, 50b of the boom. The boom may be stored or, alternatively, the boom may be supported to the rear of tailgate 36 on a mount 118 located to the top of the tailgate and a pair of brackets 120 located to the bottom of the tailgate. As may be seen to best advantage in FIGS. 1, 2 and 9, the mount 118 includes a notch 122 in an upper surface. The lower brackets 120 include a pair of spaced apart ears extending rearwardly of the tailgate in the vicinity of the brackets 64, yet in a position above the latter. Each of the arms 52a, 52b of boom 50 include a further bore 124 located rearwardly of the bores which normally accept the pins 40 in mounting the boom and once the boom is supported by the notch, i.e., the axle 62 is received in the notch as may be seen in FIG. 9, pins 40 are passed through the bores of the ears of bracket 120 and the bores 124 in the legs 50a, 50b.

The support bipod is released from confinement within bracket 98 and moved to a disposition such that the ends of legs 52a, 52b of greater spacing are disposed on the plates 92 and the other ends of the legs are disposed on a plate 126. The plates are mounted to the floor 18 at longitudinally spaced positions as may be seen in FIG. 7. With further reference to that Figure, it may be seen that the end of each of the legs 52a and 52b includes a slot 128 and, as previously indicated, the other end of the legs includes a second bore 107b in axial alignment with bores 107a. When the support bipod is disposed on the plates 92 and 126, the axle 96 will extend within the slots 128 and an ear 130 will be received between the legs 52a, 52b. A pin 40 may be passed through the bores in the legs and the axially aligned bore in the ear 130 to immobilize the support bipod. Thus, the axle 96 and pin 68 restrict both vertical and longitudinal movement of the support bipod relative to frame 18.

The particular dimensions, i.e., the length of the movement arms to either side of the pivot axes or fulcrum point may be determined by the circumstances of operation. Thus, the capacity of the hydraulic cylinder, the position at which the piston rod acts upon the bed and the angle at which the lifting and pulling forces in lifting the bed from and returning the bed to the FIG. 2 position are exerted, the length of the boom, the weight range of vehicles to be lifted, the weight of the bed to the cylinder side of the fulcrum, among others will be considered in the overall implementation of the vehicle system. Further, the cantilevered position of the boom, whether it is horizontal or angled slightly upwardly will be determined by the height to which the second vehicle 48 is to be lifted. Limited adjustment of the position of the boom for a cable of fixed length may be accomplished by locating the wheel 104 to one or the other of aligned bores 107a, 107b. Further, aligned bores may be provided and the boom may be adequately supported by a cable having about a ⅜ inch diameter.

Having described the invention with particular reference to the preferred form thereof, it will be obvious to those skilled in the art to which the invention pertains after understanding the invention, that various changes and modifications may be made therein without departing from the spirit and scope of the invention as defined by the claims appended hereto.

What is claimed is:

1. A vehicle system including a vehicle adapted for alternative use either in a capacity of a dump truck or a tow truck and readily converted from one use to the other, comprising:
   (a) a chassis;
   (b) a bed above and extending along said chassis;
   (c) means on said chassis for mounting said bed whereby said bed normally resides in a first substantially horizontal position relative to said chassis, yet is adapted for movement pivotally, said mounting means including a pivot axis located at the rear end of said chassis and said bed, whereby said bed in movement, moves pivotally to a second inclined position;
   (d) lifting means including a boom carried by said bed and extending rearwardly of the bed to define substantially a parallel extension, said bed and boom moving as a unit from said first to said second position so as to cause said boom to be inclined downwardly thereby positioning the end of said boom in position for releasably connecting said lifting means to a disabled vehicle to be lifted and towed; and
   (e) means connected between said chassis and bed for moving said bed from said first to said second position so that said disabled vehicle may be connected to said lifting means and utilizing the leverage of said bed and boom in return to said first position thereby to lift said disabled vehicle for towing, said moving means acting on said bed within the end adapted to be inclined upwardly.

2. The vehicle system of claim 1 wherein said moving means includes a two-way hydraulic cylinder having a piston rod movable in opposite directions in accordance with the pressurization of said cylinder.

3. The vehicle system of claim 2 wherein said cylinder is mounted on said chassis, and wherein said moving means further includes a mechanical linkage, said mechanical linkage being connected between said chassis and said bed, said piston rod connected to said mechanical linkage.

4. The vehicle system of claim 1 further including first and second members, one of said members mounted on said chassis and the other of said members mounted on said bed at the end adapted to be inclined upwardly, said members being positioned to interengage when said bed is in said first position, and means to releaseably secure said members together, thereby to maintain said bed in said first position when said disabled vehicle is towed.

5. The vehicle system of claim 1 including attachment means for releaseable connection to said disabled vehicle, said attachment means located at the end of said boom distant from said bed.

6. The vehicle system of claim 5 wherein said attachment means includes a tow bar, and at least one securement means for connecting a chain after having been connected to said disabled vehicle to said tow bar.

7. The vehicle system of claim 1 including a bracket having a pair of ears in spaced apart relation, said boom received between said ears, and a pin for releaseable connection of said boom to said bracket, said pin also providing an axis about which said boom may move pivotally.

8. The vehicle system of claim 1 wherein said boom includes a pair of legs extending from said bed to the distant end and having a spacing at said distant end which is no greater than the spacing at said bed, a first and second bracket each including a pair of ears in spaced apart relation, said legs of said boom received between ears of respective brackets, and a first and second pin for releaseable connection of said legs to said brackets, said pins also providing an axis about which said legs may move pivotally.

9. The vehicle system of claim 8 wherein said legs at said distant end are substantially more closely spaced than at said bed.

10. The vehicle system as claims 7 or 8 including means for supporting said boom, said support means including an elongated bipod, means for mounting said bipod so that it is disposed generally in a vertical orientation when said bed is in said first position, a cable, said cable extending between said bed at the end adapted to be inclined upwardly and said boom at the end distant from said bed, and means carried by said support means distant from said bed for entraining said cable which describes an acute angle with each of said boom and bed.

11. The vehicle system of claim 10 wherein said entraining means includes a wheel having a channel for entrained receipt of said cable, said wheel adapted to be mounted at a plurality of positions distant from said bed for moving said boom pivotally whereby for one length of cable said disabled vehicle may be lifted to a different height.

12. The vehicle system of claim 11 wherein said bipod includes a pair of bipod legs, said bipod legs having a greater spacing at the end adjacent said bed than at the other end, and further including an axle extending between said bipod legs at said other end, said wheel supported on said axle.

13. A vehicle system including a vehicle adapted for alternative use either in a capacity of a dump truck or a tow truck and readily converted from one use to the other, comprising:
(a) a chassis;
(b) a bed above and extending along said chassis;
(c) means on said chassis for mounting said bed whereby said bed normally resides in a first substantially horizontal position relative to said chassis, yet is adapted for movement pivotally, said mounting means including a pivot axis located at the rear end of said chassis and said bed, whereby said bed in movement, moves pivotally to a second inclined position;
(d) a boom carried by said bed defining a substantially parallel, cantilever extension movable with said bed as a unit;
(e) attachment means, said attachment means carried at the cantilevered end of said boom and adapted for releasable connection to a disabled vehicle to be lifted and towed when said bed and boom are moved as a unit to said second position;
(f) means connected between said chassis and bed for moving said bed from said first to said second position and in return to said first position thereby utilizing the leverage of said bed to lift the disabled vehicle for towing, said moving means acting on said bed within the end adapted to be inclined upwardly and including at least one two-way hydraulic cylinder having a piston rod movable in opposite directions in accordance with the pressurization of said cylinder.

14. A vehicle system including a vehicle adapted for alternative use either in a capacity of a dump truck or a two truck and readily converted from one use to the other, comprising:
(a) a chassis:
(b) a bed above and extending along said chassis;
(c) means on said chassis for mounting said bed whereby said bed normally resides in a first substantially horizontal position relative to said chassis, yet is adapted for movement pivotally, said mounting means including a pivot axis located at the rear end of said chassis and said bed, whereby said bed in movement, moves pivotally to a second inclined position;
(d) a boom carried by said bed defining a substantially parallel cantilever extension movable with said bed as a unit;
(e) attachment means, said attachment means carried at the cantilevered end of said boom and adapted for releasable connection to a disabled vehicle to be lifted and towed when said bed and boom are moved as a unit to said second position;
(f) means for supporting said boom, said support means including:
(i) an elongated bipod;
(ii) means for mounting said bipod so that it is disposed generally in a vertical orientation when said bed is in said first position;
(iii) a cable extending between said bed at the end adapted to be inclined upwardly and said boom at the end distant from said bed; and
(iv) means carried by said support means from said bed for entraining said cable which describes an acute angle with each of said boom and bed; and
(g) means connected between said chassis and said bed for moving said bed from said first to said second position and return to said first position thereby utilizing the leverage of said bed to lift said disabled vehicle for towing, said moving means acting on said bed within the end adapted to be inclined upwardly and including at least one dual acting hydraulic cylinder having a piston rod movable in opposite directions in accordance with the pressurization of said cylinder.

* * * * *